United States Patent
Byron, Jr. et al.

(10) Patent No.: US 6,270,636 B1
(45) Date of Patent: Aug. 7, 2001

(54) INTEGRATED MEMBRANE AND ELECTRODE SUPPORT SCREEN AND PROTECTOR RING FOR AN ELECTROCHEMICAL CELL

(75) Inventors: Robert H. Byron, Jr., Lebanon; Trent M. Molter, Glastonbury; Mark E. Dristy, Manchester, all of CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 0 days.

(21) Appl. No.: 09/464,126

(22) Filed: Dec. 16, 1999

Related U.S. Application Data

(60) Provisional application No. 60/114,557, filed on Dec. 31, 1998.

(51) Int. Cl.[7] .................................................... C25B 9/00
(52) U.S. Cl. ........................ 204/252; 204/255; 204/263; 204/265; 204/266
(58) Field of Search ................................ 204/252, 255, 204/263, 265, 266, 278.5

(56) References Cited

U.S. PATENT DOCUMENTS

| | | | |
|---|---|---|---|
| 4,545,886 | * | 10/1985 | de Nora et al. ............... 204/265 |
| 5,350,496 | * | 9/1994 | Smith et al. .................. 204/263 |
| 5,372,689 | * | 12/1994 | Carlson et al. ............... 204/263 |
| 6,024,848 | * | 2/2000 | Dufner et al. ................. 204/263 |

FOREIGN PATENT DOCUMENTS

| | | |
|---|---|---|
| 0 275 466 | 10/1987 | (EP) . |
| WO 98/24136 | 6/1998 | (WO) . |
| WO 99/27599 | 3/1999 | (WO) . |
| WO 99/27599 | 6/1999 | (WO) . |
| WO 99/61684 | 12/1999 | (WO) . |

* cited by examiner

Primary Examiner—Bruce F. Bell
(74) Attorney, Agent, or Firm—Cantor Colburn LLP

(57) ABSTRACT

The present invention is an integrated screen comprising a screen portion having openings and an integral protector edge disposed about the periphery of the screen portion. This integrated screen protector edge can be utilized individually as the membrane support/flow field in an electrochemical cell or in conjunction with one or more subsequent screen layers. When utilized with subsequent screen layers, the integrated screen protector edge is disposed adjacent to and in intimate contact with the membrane assembly.

2 Claims, 3 Drawing Sheets

INTEGRATED MEMBRANE AND ELECTRODE SUPPORT SCREEN AND PROTECTOR RING FOR AN ELECTROCHEMICAL CELL

CROSS-REFERENCE TO RELATED APPLICATIONS

This application claims the benefit of the filing date of U.S. Provisional Application Ser. No. 60/114,557 filed Dec. 31, 1998, the entire contents of which is hereby incorporated by reference.

BACKGROUND OF THE INVENTION

1. Field of the Invention

This invention relates generally to electrochemical cells, and especially relates to an integrated membrane, electrode support screen and protector ring that sustains the integrity and structure of the membrane.

2. Brief Description of the Related Art

Electrochemical cells are energy conversion devices, usually classified as either electrolysis cells or fuel cells, including, but not limited to, electrolysis cells having a hydrogen water feed. A proton exchange membrane electrolysis cell functions as a hydrogen generator by electrolytically decomposing water to produce hydrogen and oxygen gases. Referring to FIG. 1, in a typical single anode feed water electrolysis cell 101, process water 102 is reacted at oxygen electrode (anode) 103 to form oxygen gas 104, electrons, and hydrogen ions (protons) 105. The reaction is created by the positive terminal of a power source 106 electrically connected to anode 103 and the negative terminal of a power source 106 connected to hydrogen electrode (cathode) 107. The oxygen gas 104 and a portion of the process water 102' exit cell 101, while protons 105 and water 102" migrate across proton exchange membrane 108 to cathode 107 where hydrogen gas 109, is formed.

The typical electrochemical cell includes a number of individual cells arranged in a stack with fluid, typically water, forced through the cells at high pressures (e.g., a pressure differential of about 30 psi from the cell inlet to the outlet). The cells within the stack are sequentially arranged including a cathode, a proton exchange membrane, and an anode. The cathode/membrane/anode assemblies (hereinafter "membrane and electrode assembly") are supported on either side by packs of screen or expanded metal, which are in turn surrounded by cell frames and separator plates to form reaction chambers and to seal fluids therein. The screen packs establish flow fields within the reaction chambers to facilitate fluid movement and membrane hydration, and to provide mechanical support for the membrane and a means of transporting electrons to and from the electrodes.

As stated above, the screen packs support the membrane and electrode assembly. The membrane is typically only about 0.002–0.012 inches in thickness when hydrated, and the electrodes are thin structures (less than about 0.002 inches) of high surface area noble metals pressed or bonded to either side of the membrane and electrically connected to a power source. When properly supported, the membrane serves as a rugged barrier between the hydrogen and oxygen gases. The screen packs, which are positioned on both sides of the membrane against the electrodes, impart structural integrity to the membrane and electrode assembly. Due to the high pressure differential that exists in an operating cell, however, the membrane and electrode on the low pressure side can be forced into the screen packs.

In the current state of the art, the membrane and electrode are clamped between the cell frames and supported in the active area by a screen pack or other similar porous device. (See FIG. 2) By the nature and design of the assembly, there is a gap 122 between the frame component 124 and the screen pack 126 that the membrane and electrode assembly 128 must span. The pressure on one side of the membrane and electrode assembly 128 is generally higher than the pressure on the other side of the membrane and electrode assembly 128, and the membrane and electrode assembly, must be capable of supporting this pressure differential. The gap 122 between the frame 124 and the screen pack 126 is generally too wide for the membrane and electrode assembly 128 to span and support the pressure differential without perforating. In addition, edges of the screen pack 130 often have burrs and/or other features that are likely to puncture the membrane and/or electrode.

Conventional screen packs have a number of disadvantages and drawbacks. For example, existing screen packs 126 comprise multiple layers of screen material formed from 0.005 inches (0.127 millimeters (mm))–0.010 inches (0.254 mm) thick metal strands having pattern openings of 0.125 inches (3.17 mm) by 0.053 inches (1.35 mm) to 0.071 inches (1.80 mm) (commonly known as 3/0 screen). Under typical operating conditions, a pressure differential of about 390 pounds per square inch (psi) forces the membrane assembly into the openings of the first layer of screen on the low pressure side of the cell. Due to the extrusion of the membrane into this screen layer, the membrane stress in the center of a screen opening increases to about 4,600 psi, while the membrane material has a maximum rating of only about 2,000 psi. Consequently, high axial stresses may force the screen strands into the membrane over time, thereby filling the screen void areas with membrane material. Alternatively, the membrane may rupture, allowing mixing of hydrogen and oxygen gases.

The current state of the art addresses both of the problems associated with pressure differentials and burrs by incorporating a thin metal or polymer protector ring 132 into the electrochemical cell. This ring 132 supports the pressure load imposed on the membrane and electrode assembly 128 over the gap 122 between the cell frame 124 and screen pack 126. The protector ring 132 also provides an impenetrable barrier for the membrane and electrode assembly 128 against the otherwise detrimental screen pack edge features 130.

However, protector rings used in conventional devices pose a number of problems for the construction and operation of the electrochemical cells. First, the protector ring is costly to manufacture, especially when made from materials suitable for use in an electrochemical cell, since much of the material is wasted in the fabrication process. Also, the protector ring is flimsy and difficult to position accurately in the cell assembly, and it is also prone to being dislodged from its intended position during the handling associated with the cell assembly process. Finally, internal cell dynamics associated with repeated pressure cycles can cause relative motion between cell components, which may serve to mislocate the protector ring even after successful cell assembly. This may result in the membrane and electrode ultimately being exposed to the gap and screen pack edge, resulting in perforation and cell failure.

What is needed in the art is a readily manufactured, improved protector ring and screen assembly that provides protection for, and structural integrity to, the membrane and electrode, without adversely affecting the cell's mass flow characteristics.

SUMMARY OF THE INVENTION

The above-described drawbacks and disadvantages of the prior art are alleviated by the integrated screen and protector ring, improved screen assembly, and electrochemical cell of the present invention. The integrated screen and protector ring comprises: at least one screen layer having openings and an integral protector edge about its periphery.

The improved screen assembly of the present invention comprises: a first screen layer having first openings and an integral protector edge about its periphery; and at least one subsequent screen layer having second openings, wherein said subsequent screen layer is disposed parallel to and in contact with said first screen layer.

The electrochemical cell of the present invention comprises: a membrane; an electrode disposed on each side of the membrane; and a screen assembly disposed adjacent to each of the electrodes, with at least one of the screen assemblies having a first screen layer having first openings and an integral protector edge about its periphery.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

The Figures are meant to further illustrate the present invention and not to limit the scope thereof.

DETAILED DESCRIPTION OF THE PREFERRED EMBODIMENT

Figure 1:
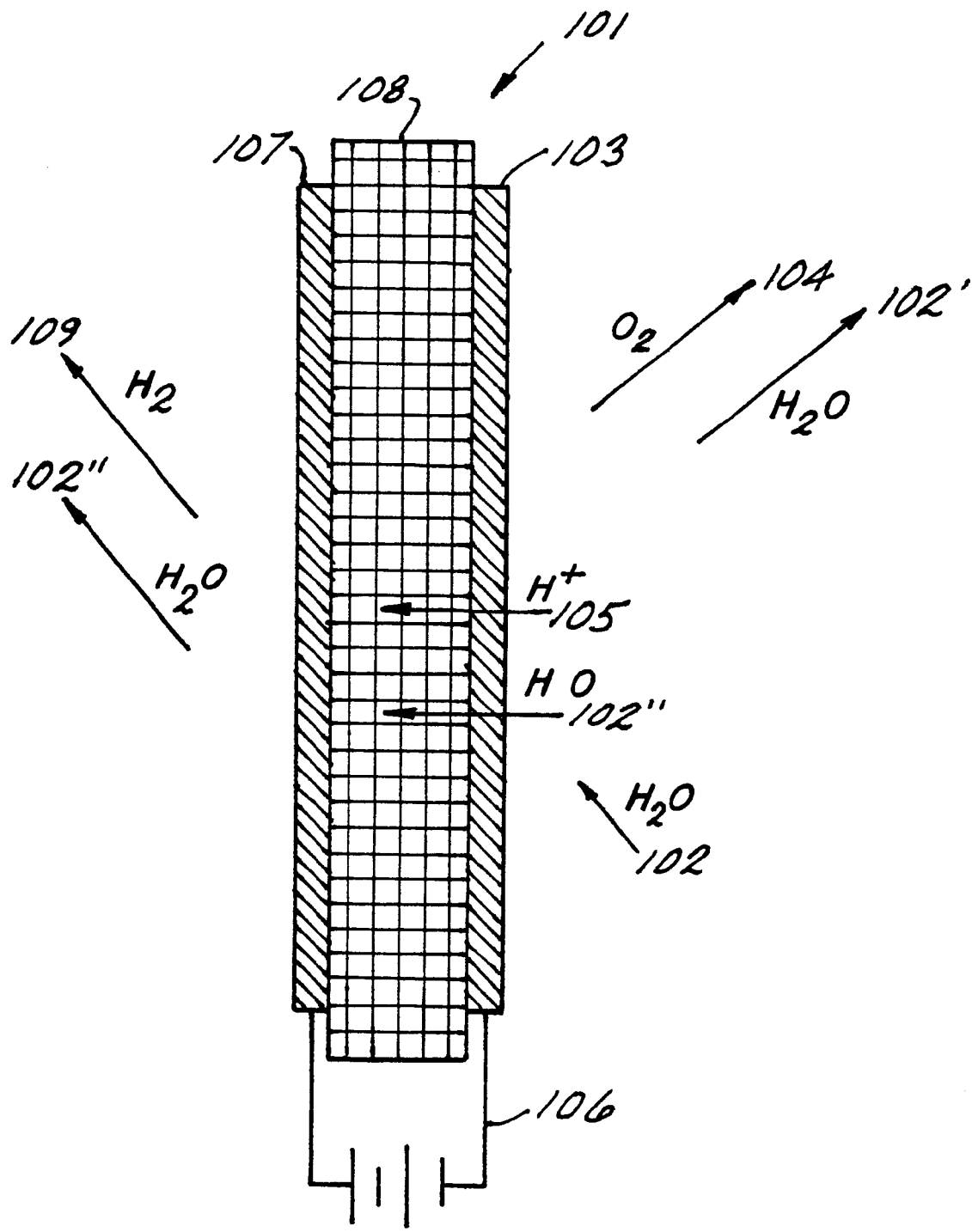
FIG. 1 is a schematic diagram of a prior art electrochemical cell showing an electrochemical reaction.
Figure 2:
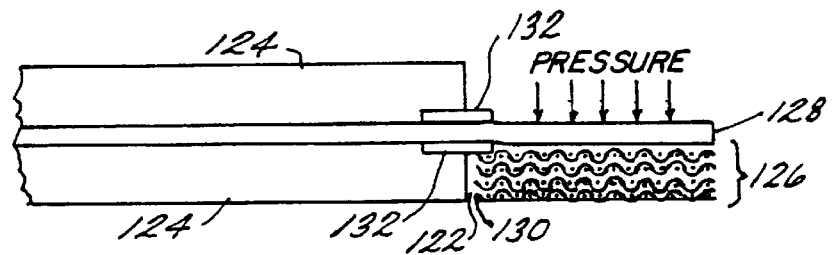
FIG. 2 is a cross sectional view of a conventional electrochemical cell showing the relationship between the active site and the cell frame.
Figure 3:
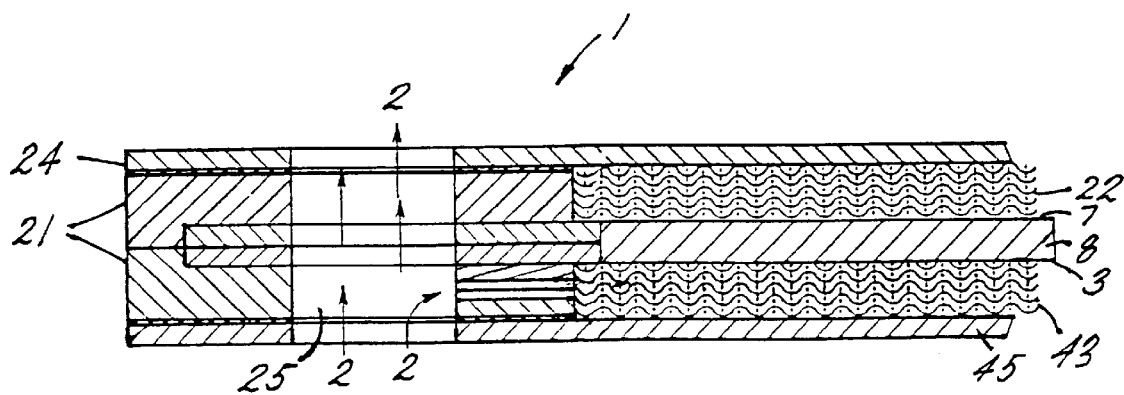
FIG. 3 is a cross sectional view of an electrochemical cell showing the relationship of the cell components.

The integrated screen and protector edge of the present invention comprises a combination of a screen and a protector ring for an electrochemical cell in a single component. Referring to FIG. 3, the basic electrochemical cell 1 includes proton exchange membrane 8 having an anode electrode 3 and a cathode electrode 7 bonded to either side, with the periphery of membrane 8 installed between a pair of cell frames 21. Oxygen screen pack 43 is installed inside the active area of the frame assembly between anode 3 and oxygen separator plate 45, while hydrogen screen pack 22 is installed inside of cell frame 21 between hydrogen separator plate 24 and cathode 7.

In the operation of one embodiment of an electrochemical cell of the present invention, process water 2 enters inlet port 25 and a portion of the water is diverted into oxygen screen pack 43. A portion of the water 2, not diverted into screen pack 43, continues along conduit 25 formed by axially aligned holes in the components comprising the stack and enters subsequent cells in the cell stack (not shown) positioned outside of the cell 1. The portion of process water 2 diverted through screen pack 43 contacts anode 3 where the water electrochemically converts to oxygen gas and protons. Oxygen gas and excess water are exhausted from the cell through similar porting arrangements as those which directed the water to the anode 3. The generation of gases in the cell combined with external pressure regulation produces a large pressure differential between the oxygen side and the hydrogen side of the cell. This pressure differential forces membrane 8 and cathode 7 against the opposing screen pack. It should be noted that the direction of the pressure differential (greater or lower pressure on the cathode side) is dependent upon the application requirements of the electrochemical system.

Figure 4:
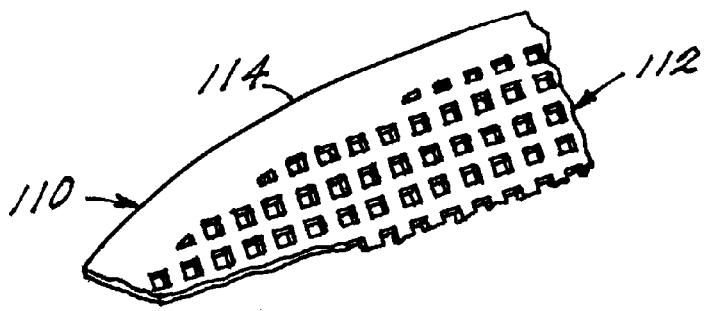
FIG. 4 is a partial view of the integrated membrane and electrode screen support and protector ring of the present invention.

FIG. 4 shows an embodiment of the present invention with a partial view of the screen 112 with an integral protector edge 114 about its periphery. Although the integrated screen and protector edge 110 can be formed as one component or formed individually and bonded together, it is preferred to form this integrated component as one component, eliminating bonding requirements and possible problems, such as delamination, associated therewith. Possible production processes include those commonly known in the art, including, but not limited to, photochemical etching or laser cutting, which are preferred processes because they are inexpensive and they produce little waste.

The screen portion 112 of the integrated screen and protector edge 110 should be formed from an electrically conductive material. Possible materials for the integrated screen portion 112 include metals, polymers, and combinations thereof suitable for use with electrochemical cells, preferably in the form of a thin sheet. The thickness of the sheet, which is system dependent, is typically less than about 0.005 inches, with about 0.002 inches to about 0.004 inches preferred, and about 0.0025 inches to about 0.0035 inches especially preferred. Suitable metals and polymers include steel, such as stainless steel, nickel, niobium, zirconium, cobalt, tantalum, titanium, elastomers, thermoplastic or thermosetting polymers, ceramics, polyetherimide, polysulfone, polyether sulfone, polyethylether ketone, and other metals, metal alloys, other materials, and polymers, and mixtures and combinations thereof.

Figure 5:
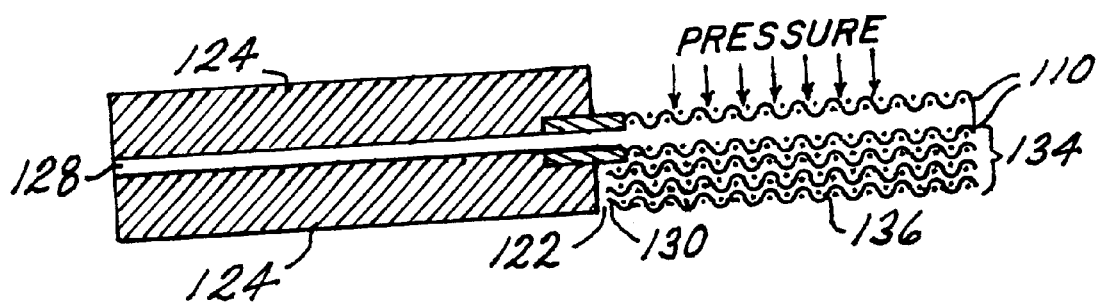
FIG. 5 is a cross sectional view of the electrochemical cell of the present invention showing the incorporation of the integrated membrane and electrode support screen and protector ring.

Although the integrated screen and protector edge 110 can be employed as the membrane support/fluid flow field, it is typically utilized in a subassembly 134 comprising the integrated screen protector edge 110 bonded or otherwise disposed adjacent to and in intimate contact with at least one, and preferably a plurality, of subsequent screen layers 136 (see FIG. 5). These screen layers 136 can similarly be formed from electrically conductive material, such as etched or perforated sheets or a woven metal mesh, and are typically composed of material including steel, such as stainless steel, nickel, niobium, zirconium, cobalt, tantalum, titanium, among others and alloys thereof. The geometry of the openings in the screen and subsequent screen layers can range from ovals, circles, and hexagons, to diamonds and other elongated shapes. An especially preferred screen assembly for use in electrochemical cells is disclosed in commonly assigned U.S. patent Ser. No. 09/102,305, to Trent M. Molter, (herein incorporated by reference).

The integrated screen and protector edge 110 is preferably integrated into the overall subassembly 134, as shown in FIG. 5, via a tack weld process, bonded to the supporting frame (i.e. to the integrated screen/protector edge) using an adhesive material, or other conventional process known in the art. The tack weld process creates a subassembly 134 that is easy to handle and is self locating within the cell.

The integrated screen and protector edge 110 or the subassembly 134 supports a membrane assembly composed of a cathode/membrane/anode arrangement, wherein the cathode and anode are disposed in intimate contact with the membrane, and an integrated screen-protector edge is disposed in intimate contact with the cathode and anode accordingly. The membrane can be any conventional membrane, including, but not limited to, proton exchange membranes including homogeneous perfluoroionomers such as Nafion® (commercially available from E. I. duPont de Nemours and Company, Wilmington, Del.), ionomer Teflon® composites such as Gore Select® (commercially available from W. L. Gore Associates, Inc., Elkton, Md.), styrene, divinyl benzene, and mixtures thereof. Similarly, the cathode and anode electrodes can be conventional electrodes composed of materials such as platinum, palladium, rhodium, carbon, gold, tantalum, tungsten, ruthenium, iridium, osmium, alloys thereof and other catalysts capable of electrolyzing water and producing hydrogen.

The advantages of incorporating the integrated screen and protector edge of the present invention into the screen pack subassembly are immediately apparent considering the fact that the protector edge 114 (See FIG. 4), which is an integral part of the screen pack protector ring subassembly 134, is no longer subject to mislocation due to cell pressure cycles. Indeed, it is essentially mechanically locked into its position relative to the gap 122 of the electrochemical cell frame 124. Also, the protector ring is effectively stabilized due to its combination with the support screen, resulting in a stronger, more durable product with a lower fabrication cost relative to the production of separate parts.

Further, incorporation of the screen pack subassembly into the electrochemical cell, as shown in FIG. 5, results advantageously in rigid protection of the membrane and electrode assembly 128 from both pressure differentials across the active site of the cell, and membrane ruptures that might otherwise be caused by burrs 130 along the edge of the screen pack. As such, the present invention represents a substantial increase in the durability and effective lifetime of electrochemical cells with a low cost of fabrication.

Although the present invention has been described in relation to an electrolysis cell, it is understood that the integrated screen and protector edge can be employed in all electrochemical cells, e.g. anode feed water and cathode feed water electrolysis cells, and fuel cells. It is further understood that the details of the electrochemical reactions, preferred reactants, and preferred components will change accordingly, as is conventionally understood.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An electrochemical cell, comprising:

a membrane;

an electrode disposed on each side of said membrane to form a membrane assembly; and at least one integral screen protector edge, said screen protector edge having a first screen portion having first openings with an integral protector edge disposed about the periphery of said first screen portion, said integral screen protector edge disposed in intimate contact with said membrane assembly.

2. An electrochemical cell as in claim 1, further comprising at least one subsequent screen layer having second openings, wherein said subsequent screen layer is disposed parallel to and in contact with said first screen portion.

* * * * *